US012578196B2

(12) United States Patent
Leng

(10) Patent No.: US 12,578,196 B2
(45) Date of Patent: Mar. 17, 2026

(54) ROAD RECOGNITION METHOD AND APPARATUS

(71) Applicant: Huawei Technologies Co., Ltd., Shenzhen (CN)

(72) Inventor: Ye Leng, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 136 days.

(21) Appl. No.: 18/253,700

(22) PCT Filed: Nov. 16, 2021

(86) PCT No.: PCT/CN2021/130988
§ 371 (c)(1),
(2) Date: May 19, 2023

(87) PCT Pub. No.: WO2022/105758
PCT Pub. Date: May 27, 2022

(65) Prior Publication Data
US 2024/0125603 A1 Apr. 18, 2024

(30) Foreign Application Priority Data
Nov. 20, 2020 (CN) .......................... 202011309744.3

(51) Int. Cl.
| | |
|---|---|
| *G01C 21/30* | (2006.01) |
| *G06V 10/10* | (2022.01) |
| *G06V 10/94* | (2022.01) |
| *G06V 20/56* | (2022.01) |
| *H04N 5/265* | (2006.01) |

(Continued)

(52) U.S. Cl.
CPC ............. *G01C 21/30* (2013.01); *G06V 10/16* (2022.01); *G06V 10/94* (2022.01); *G06V 20/588* (2022.01); *H04N 5/265* (2013.01); *H04N 7/181* (2013.01); *H04N 23/661* (2023.01); *H04N 23/80* (2023.01)

(58) Field of Classification Search
CPC ........ G01C 21/30; G06V 10/94; G06V 10/16; G06V 20/588; H04N 23/661; H04N 23/80; H04N 5/265; H04N 7/181
See application file for complete search history.

(56) References Cited

U.S. PATENT DOCUMENTS 11,570,372 B2 * 1/2023 Nishioka ................. G06T 15/06
2010/0061591 A1 3/2010 Okada et al.
(Continued)

FOREIGN PATENT DOCUMENTS

CN 101346603 B 8/2011
CN 104729480 A 6/2015
(Continued)

*Primary Examiner* — Adnan M Mirza
(74) *Attorney, Agent, or Firm* — Conley Rose, P.C.

(57) ABSTRACT

A road recognition method includes, when detecting a road recognition request, a first device that sends, by using a DMSDP service, a control command to an entity camera corresponding to a virtual camera HAL, where the control command is for controlling the entity camera to capture a current image. The first device receives, by using the DMSDP service, the current image returned by the entity camera in response to the control command and the first device recognizes, based on the current image and road information that is obtained by a local navigation application, a road on which the first device is located.

17 Claims, 13 Drawing Sheets

(51) Int. Cl.
  *H04N 7/18*          (2006.01)
  *H04N 23/661*        (2023.01)
  *H04N 23/80*         (2023.01)

(56)                    References Cited

U.S. PATENT DOCUMENTS

| | | | | |
|---|---|---|---|---|
| 2013/0321401 A1* | 12/2013 | Piemonte | ............ | G06F 16/2291 |
| | | | | 345/419 |
| 2017/0356754 A1* | 12/2017 | Fillhardt | ............ | G01C 21/3635 |
| 2023/0022153 A1 | 1/2023 | Jiang et al. | | |
| 2023/0046272 A1 | 2/2023 | Tao et al. | | |

FOREIGN PATENT DOCUMENTS

| | | | |
|---|---|---|---|
| CN | 110617826 A | 12/2019 |
| CN | 111083364 A | 4/2020 |
| CN | 111193870 A | 5/2020 |
| CN | 111351474 A | 6/2020 |

* cited by examiner

S70

A second device receives, by using a DMSDP service, a
control command sent by a first device, where the control
command is for controlling the second device to capture a
current image

S71

The second device enables a camera based on the control
command, and captures the current image

S72

The second device sends the current image to the first device

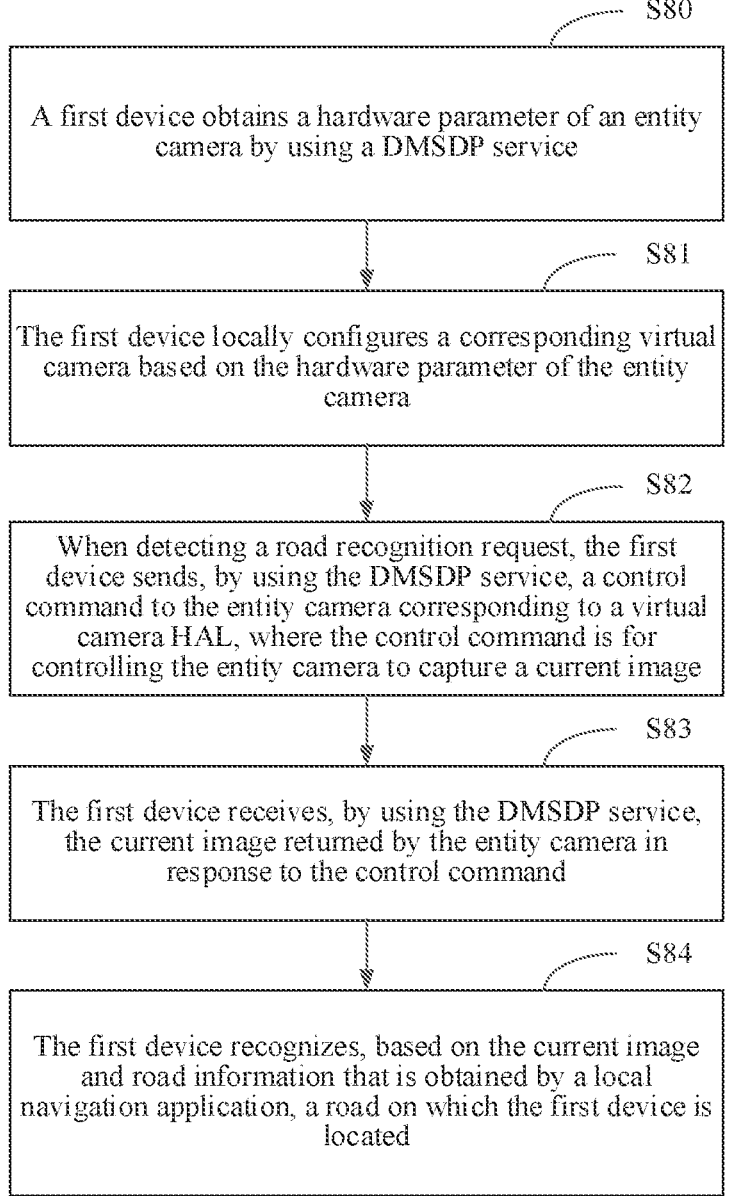

S80

A first device obtains a hardware parameter of an entity camera by using a DMSDP service

S81

The first device locally configures a corresponding virtual camera based on the hardware parameter of the entity camera

S82

When detecting a road recognition request, the first device sends, by using the DMSDP service, a control command to the entity camera corresponding to a virtual camera HAL, where the control command is for controlling the entity camera to capture a current image

S83

The first device receives, by using the DMSDP service, the current image returned by the entity camera in response to the control command

S84

The first device recognizes, based on the current image and road information that is obtained by a local navigation application, a road on which the first device is located

FIG. 8

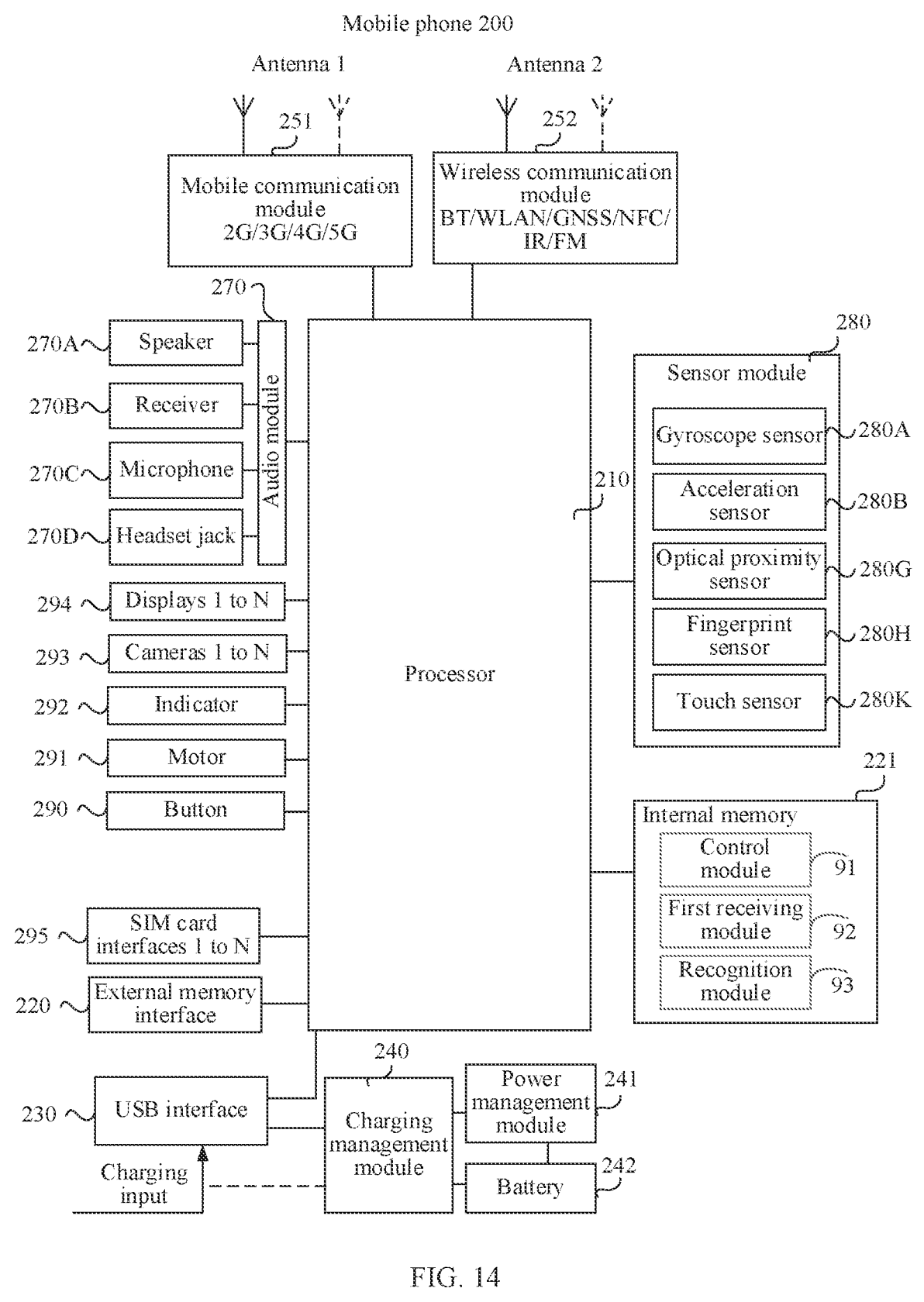

Mobile phone 200

Antenna 1          Antenna 2

251

252

Mobile communication module
2G/3G/4G/5G

Wireless communication module
BT/WLAN/GNSS/NFC/IR/FM

270

270A — Speaker

270B — Receiver

270C — Microphone

270D — Headset jack

Audio module

294 — Displays 1 to N

293 — Cameras 1 to N

292 — Indicator

291 — Motor

290 — Button

295 — SIM card interfaces 1 to N

220 — External memory interface

230 — USB interface

Charging input

240

Charging management module

Processor

210

280

Sensor module

Gyroscope sensor — 280A

Acceleration sensor — 280B

Optical proximity sensor — 280G

Fingerprint sensor — 280H

Touch sensor — 280K

221

Internal memory

Control module — 91

First receiving module — 92

Recognition module — 93

Power management module — 241

Battery — 242

FIG. 14

ROAD RECOGNITION METHOD AND APPARATUS

CROSS-REFERENCE TO RELATED APPLICATIONS

This is a National Stage Application of International Patent Application No. PCT/CN2021/130988 filed on Nov. 16, 2021, which claims priority to Chinese Patent Application No. 202011309744.3 filed on Nov. 20, 2020. Both of the aforementioned applications are hereby incorporated by reference in their entireties.

TECHNICAL FIELD

This application relates to the field of computer technologies, and in particular, to a road recognition method and an apparatus.

BACKGROUND

Vehicle-mounted panoramic imaging is a vehicle photography technology that combines images captured by a plurality of cameras on a vehicle, to provide a plurality of views, such as a top view, a rear view, and a panoramic view. FIG. 1 is a schematic diagram of an example of vehicle-mounted panoramic imaging. As shown in FIG. 1, a plurality of cameras may be mounted on a front side, a rear side, a left side, and a right side of a vehicle, to respectively capture a plurality of images in different directions, display a vision field outside the vehicle to a driver, assist the driver, and warn the driver of an obstacle that may not be immediately seen on a path. In the vehicle-mounted panoramic imaging technology, only a road environment condition near the vehicle is displayed, and positioning cannot be performed.

In vehicle-mounted navigation, GPS navigation is applied to vehicle navigation by using a commercial communication satellite, to provide a navigation service for a vehicle driver. A vehicle-mounted GPS navigation system may guide, by receiving a GPS satellite signal, a vehicle on an urban road or a suburban road, or even in a desert, gobi, or grassland in which people are rarely seen, to avoid a trouble caused by a driver due to unfamiliarity with a road condition.

A navigation application that uses a satellite to perform a series of services such as positioning and guidance on terminal hardware brings great convenience to travel. Currently, the navigation application may provide services such as path recommendation between two places, road condition indication, and real-time positioning. The navigation application has advantages such as high global coverage, high-speed, time-saving, high efficiency, wide application, multi-function, and mobile positioning.

The vehicle-mounted navigation and the navigation application that is on a terminal are limited by a scenario during navigation. For example, when a vehicle travels under a highway or a viaduct, or travels on a wide but curved road, a correct lane cannot be accurately positioned when a road condition is complex. Alternatively, a user needs to manually select a lane. FIG. 2a and FIG. 2b each are a schematic diagram of an example in which a user manually selects a lane. As shown in FIG. 2a, when a vehicle moves near a viaduct, an icon (control) for a user to manually select whether the vehicle is on the viaduct is displayed in a lower left corner of a display. As shown in FIG. 2b, if the user selects that the vehicle is not on the viaduct, but is under the viaduct, a control (which is in a lower right corner of FIG. 2b) for the user to select whether the vehicle is on an auxiliary road may further be displayed on the display. A perception of a road by the user is subjective. In one aspect, a wrong road is easily selected, causing driving on the wrong road or a detour. In another aspect, the user may be distracted, and a security risk may be caused.

SUMMARY

In view of this, a road recognition method and an apparatus are provided, so that an accurate road can be positioned based on a real-time image around a vehicle, and navigation can still be correctly performed without user manual selection when a road condition is complex, so that navigation can be correctly implemented, and a security risk can be eliminated.

According to a first aspect, an embodiment of this application provides a road recognition method. The method is applied to a first device, and the first device includes two or more virtual camera HALs. The method includes:

when detecting a road recognition request, the first device sends, by using a DMSDP service, a control command to an entity camera corresponding to the virtual camera HAL, where the control command is for controlling the entity camera to capture a current image;

the first device receives, by using the DMSDP service, the current image returned by the entity camera in response to the control command; and the first device recognizes, based on the current image and road information that is obtained by a local navigation application, a road on which the first device is located.

In a first possible implementation of the first aspect, the first device obtains a hardware parameter of the entity camera by using the DMSDP service; and the first device locally configures a corresponding virtual camera based on the hardware parameter of the entity camera.

According to the first possible implementation of the first aspect, in a second possible implementation, the hardware parameter includes a camera capability parameter of the entity camera. That the first device locally configures a corresponding virtual camera based on the hardware parameter of the entity camera includes: The first device creates, based on the camera capability parameter, a virtual camera hardware abstraction layer HAL and a camera framework that correspond to the entity camera, and adds the camera framework to a distributed camera framework.

In a third possible implementation of the first aspect, the DMSDP service includes a command pipeline and a data pipeline.

That the first device sends, by using a DMSDP service, a control command to an entity camera corresponding to the virtual camera HAL includes: The first device sends, by using the command pipeline of the DMSDP service, the control command to the entity camera corresponding to the virtual camera.

That the first device receives, by using the DMSDP service, the current image returned by the entity camera in response to the control command includes: The first device receives, by using the data pipeline of the DMSDP service, the current image returned by the entity camera in response to the control command.

In a fourth possible implementation of the first aspect, that the first device recognizes, based on the current image and road information that is obtained by a local navigation application, a road on which the first device is located includes:

a camera HAL of a local camera of the first device splices a plurality of current images, to obtain a spliced image; and the navigation application of the first device recognizes, based on the spliced image and the road information that is obtained by the navigation application, the road on which the first device is located.

According to the first aspect or any one of the first possible implementation to the fourth possible implementation of the first aspect, in a fifth possible implementation, the entity camera is a vehicle-mounted camera.

According to a second aspect, an embodiment of this application provides an image obtaining method. The method includes:

a second device receives, by using a DMSDP service, a control command sent by a first device, where the control command is for controlling the second device to capture a current image;

the second device enables a camera based on the control command, and captures the current image; and the second device sends the current image to the first device.

In a first possible implementation of the second aspect, the method further includes:

when receiving a configuration request sent by the first device, the second device sends, by using the DMSDP service, a hardware parameter of an entity camera of the second device to the first device.

According to a third aspect, an embodiment of this application provides a road recognition apparatus. The apparatus is used in a first device, and the first device includes two or more virtual camera HALs. The apparatus includes:

a control module, configured to: when detecting a road recognition request, send, by using a DMSDP service, a control command to an entity camera corresponding to the virtual camera HAL, where the control command is for controlling the entity camera to capture a current image;

a first receiving module, configured to receive, by using the DMSDP service, the current image returned by the entity camera in response to the control command; and a recognition module, configured to recognize, based on the current image and road information that is obtained by a local navigation application, a road on which the first device is located.

In a first possible implementation of the third aspect, the apparatus further includes:

an obtaining module, configured to obtain a hardware parameter of the entity camera by using the DMSDP service; and a configuration module, configured to locally configure a corresponding virtual camera based on the hardware parameter of the entity camera.

According to the first possible implementation of the third aspect, in a second possible implementation, the hardware parameter includes a camera capability parameter of the entity camera.

The configuration module includes:

a configuration unit, configured to create, based on the camera capability parameter, a virtual camera hardware abstraction layer HAL and a camera framework that correspond to the entity camera, and add the camera framework to a distributed camera framework.

In a third possible implementation of the third aspect, the DMSDP service includes a command pipeline and a data pipeline.

The control module includes a control unit, configured to send, by using the command pipeline of the DMSDP service, the control command to the entity camera corresponding to the virtual camera.

The first receiving module includes a receiving unit, configured to receive, by using the data pipeline of the DMSDP service, the current image returned by the entity camera in response to the control command.

In a fourth possible implementation of the third aspect, the recognition module includes:

a splicing unit, configured to splice a plurality of current images by using a camera HAL of a local camera, to obtain a spliced image; and a recognition unit, configured to recognize, by using the navigation application based on the spliced image and the road information that is obtained by the navigation application, the road on which the first device is located.

According to the third aspect or any one of the first possible implementation to the fourth possible implementation of the third aspect, in a fifth possible implementation, the entity camera is a vehicle-mounted camera.

According to a fourth aspect, an embodiment of this application provides an image obtaining apparatus. The apparatus includes:

a second receiving module, configured to receive, by using a DMSDP service, a control command sent by a first device, where the control command is for controlling a second device to capture a current image;

a photographing module, configured to enable a camera based on the control command, and capture the current image; and a first sending module, configured to send the current image to the first device.

In a first possible implementation of the fourth aspect, the apparatus further includes:

a second sending module, configured to: when receiving a configuration request sent by the first device, send a hardware parameter of an entity camera of the second device to the first device by using the DMSDP service.

According to a fifth aspect, an embodiment of this application provides a data transmission apparatus, including:

a processor; and a memory, configured to store instructions executable for the processor.

The processor is configured to implement the method in any one of the implementations of the first aspect or the method in any one of the implementations of the second aspect when executing the instructions.

According to a sixth aspect, an embodiment of this application provides a non-volatile computer-readable storage medium, where the non-volatile computer-readable storage medium stores computer program instructions. When the computer program instructions are executed by a processor, the method in any one of the implementations of the first aspect or the method in any one of the implementations of the second aspect is implemented.

According to a seventh aspect, an embodiment of this application provides a terminal device. The terminal device can perform the road recognition method in one or more of the first aspect or the plurality of possible implementations of the first aspect.

According to an eighth aspect, an embodiment of this application provides a computer program product, including computer-readable code, or a non-volatile computer-readable storage medium carrying computer-readable code. When the computer-readable code is run on an electronic device, a processor in the electronic device performs the road recognition method in one or more of the first aspect or the plurality of possible implementations of the first aspect.

According to a ninth aspect, an embodiment of this application provides a terminal device. The terminal device can perform the image obtaining method in one or more of the second aspect or the plurality of possible implementations of the second aspect.

According to a ninth aspect, an embodiment of this application provides a computer program product, including computer-readable code, or a non-volatile computer-readable storage medium carrying computer-readable code. When the computer-readable code is run on an electronic device, a processor in the electronic device performs the image obtaining method in one or more of the second aspect or the plurality of possible implementations of the second aspect.

These aspects and other aspects of this application are more concise and more comprehensive in descriptions of the following (a plurality of) embodiments.

BRIEF DESCRIPTION OF DRAWINGS

The accompanying drawings included in this specification and constituting a part of this specification and this specification jointly show example embodiments, features, and aspects of this application, and are intended to explain principles of this application.

FIG. 8 is a flowchart of a road recognition method according to an embodiment of this application;

FIG. 14 is a schematic diagram of a structure of a terminal device according to an embodiment of this application.

DESCRIPTION OF EMBODIMENTS

Figure 1:
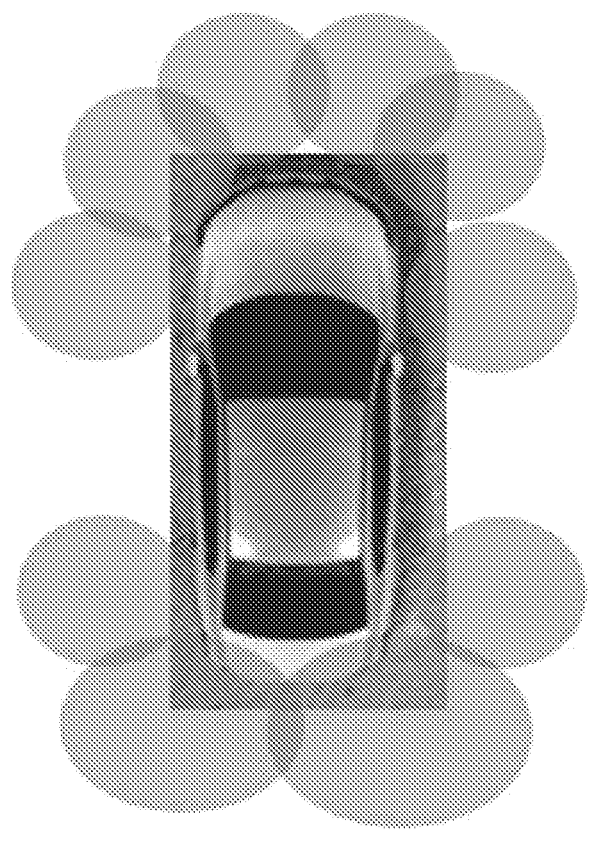
FIG. 1 is a schematic diagram of an example of vehicle-mounted panoramic imaging.
Figure 2A:
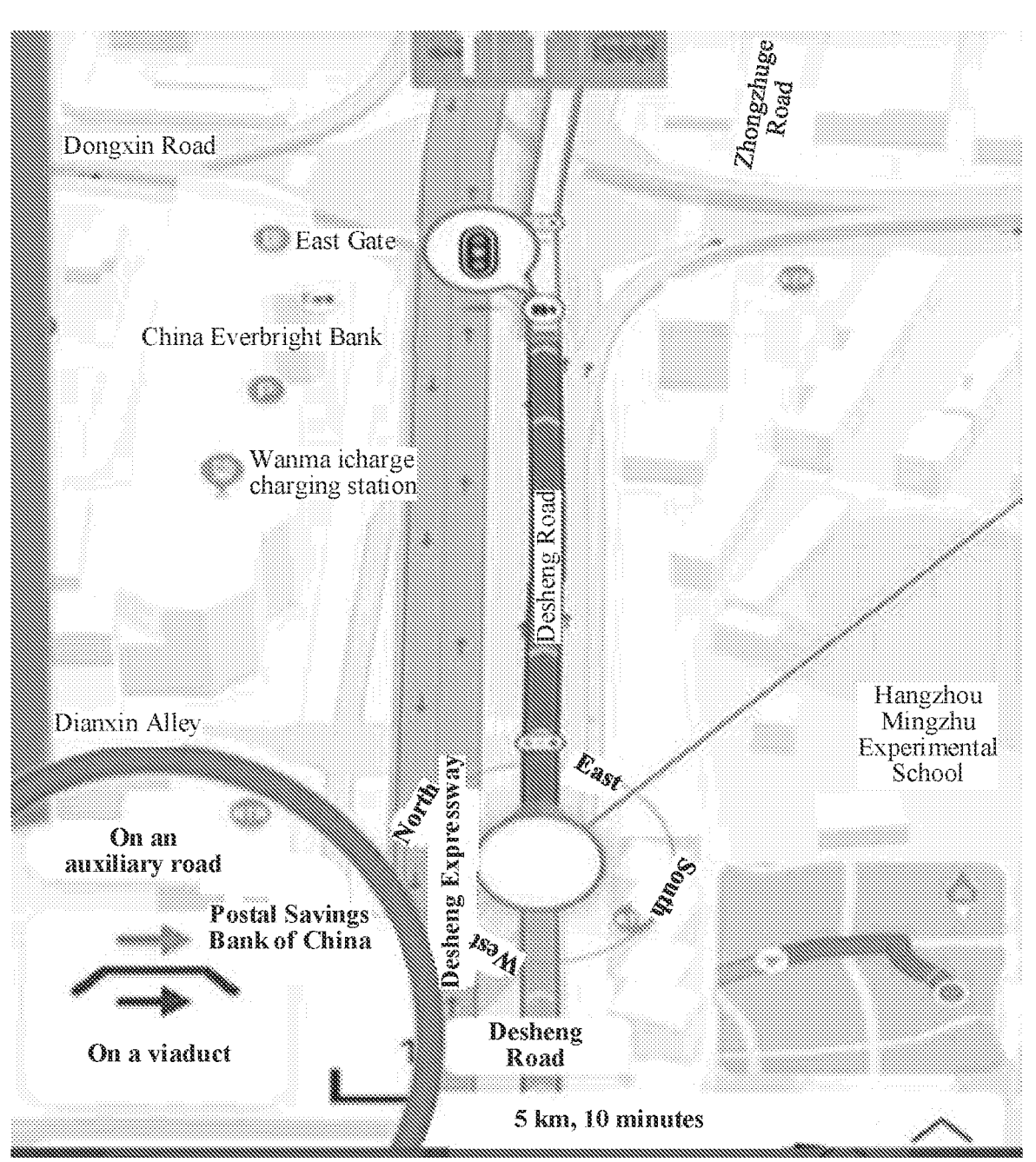
FIG. 2a and FIG. 2b each are a schematic diagram of an example in which a user manually selects a lane.
Figure 2B:
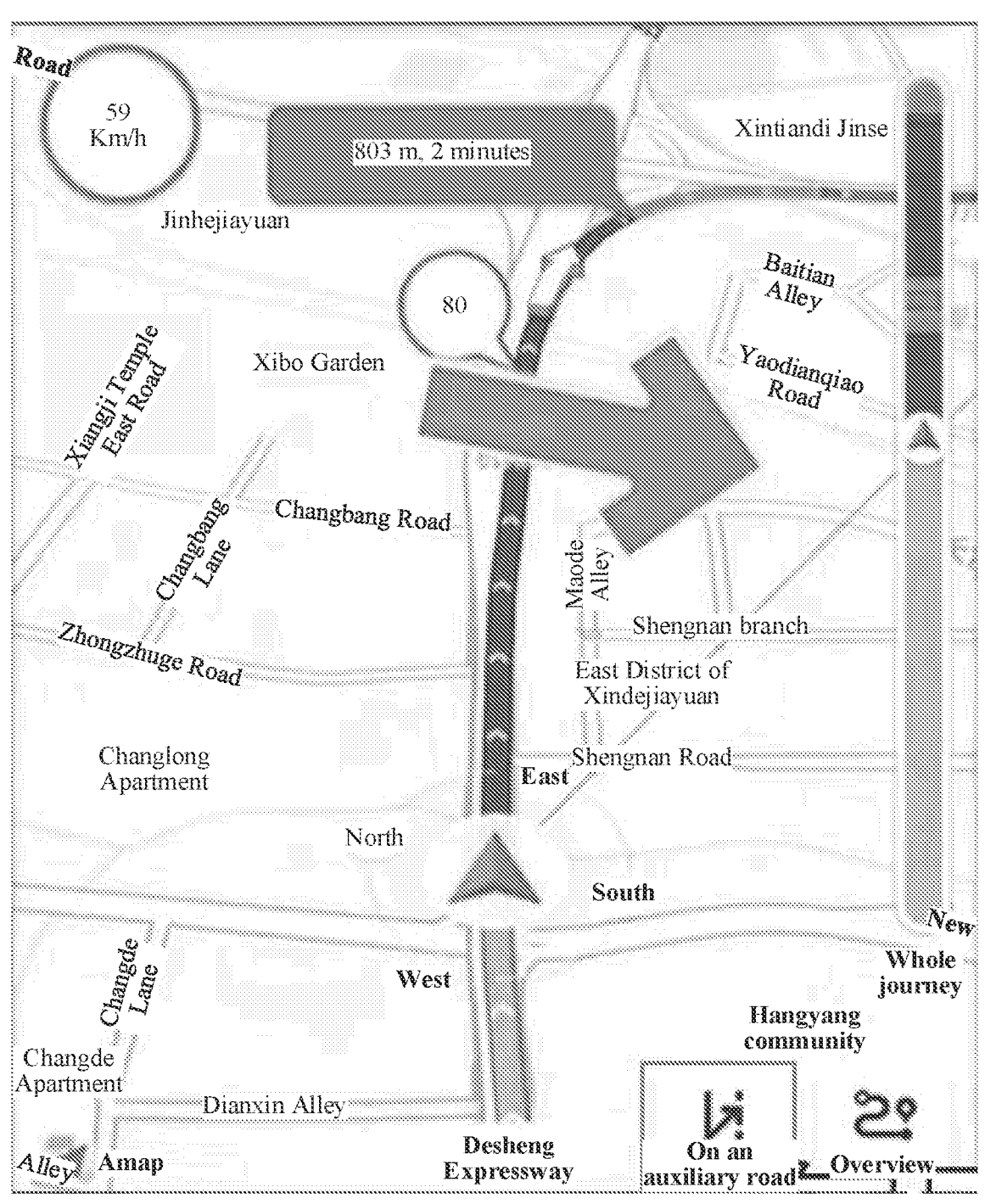

The following describes various example embodiments, features, and aspects of this application in detail with reference to the accompanying drawings. Identical reference numerals in the accompanying drawings indicate elements that have same or similar functions. Although various aspects of embodiments are illustrated in the accompanying drawing, the accompanying drawings are not necessarily drawn in proportion unless otherwise specified.

The specific term "example" herein means "used as an example, an embodiment, or an illustration". Any embodiment described as "exemplary" is not necessarily explained as being superior or better than other embodiments.

In addition, to better describe this application, numerous specific details are provided in the following specific implementations. A person skilled in the art should understand that this application can also be implemented without some specific details. In some embodiments, methods, means, elements, and circuits that are well-known to a person skilled in the art are not described in detail, so that the subject matter of this application is highlighted.

In a related technology, a surrounding image is captured by using a mobile phone, and an accurate road is positioned based on the captured image and road information that is obtained by a navigation application. However, this manner is not applicable to a vehicle driving process, and a plurality of captured images may be in different places, which is not helpful in accurate positioning.

To resolve the foregoing technical problem, this application provides a road recognition method. The road recognition method in embodiments of this application can implement communication between a mobile phone (or another terminal device such as a tablet or a smartwatch) and a plurality of vehicle-mounted cameras. The mobile phone controls the vehicle-mounted camera to capture a current image around a vehicle and send the current image back to the mobile phone. The mobile phone determines accurate road information based on the current image and road information that is obtained by a navigation application. In comparison with vehicle-mounted navigation in a conventional technology, according to the road recognition method in this implementation of this application, an accurate road can be positioned based on a real-time image around a vehicle, and navigation can still be correctly performed w % ben a road condition is complex. In comparison with a navigation application in a terminal, according to the road recognition method in this implementation of this application, the accurate road can also be positioned based on the real-time image around the vehicle without user manual selection, so that navigation can be correctly implemented, and a security risk can be eliminated.

Figure 3:
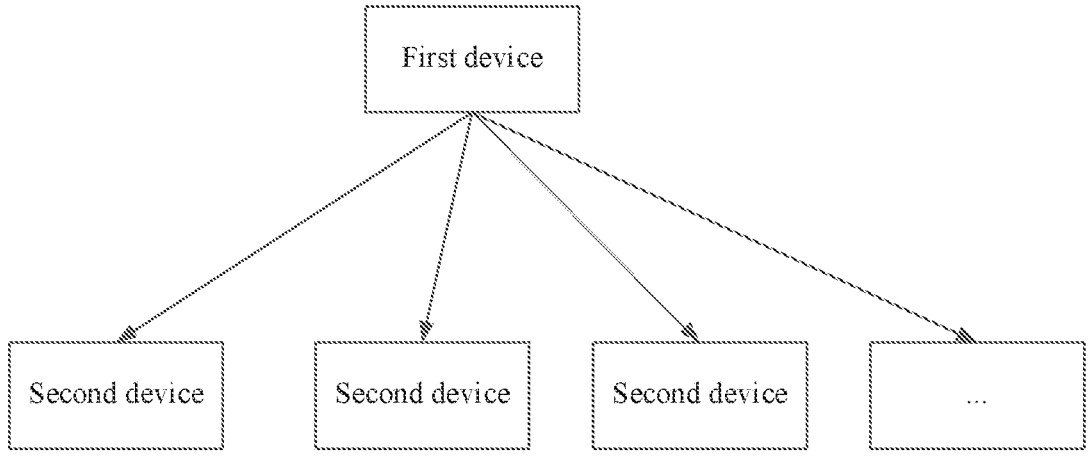
FIG. 3 is a schematic diagram of an application scenario of a road recognition method according to an embodiment of this application.

FIG. 3 is a schematic diagram of an application scenario of a road recognition method according to an embodiment of this application. As shown in FIG. 3, the application scenario may include a first device, and the first device may be a terminal device such as a mobile phone, a Pad, or a smartwatch. The application scenario may further include one or more second devices. The second device may be a vehicle-mounted camera, a mobile phone, a Pad, a smartwatch, or the like that includes a camera. In an application scenario, the first device may be a mobile phone, and the second device may be a vehicle-mounted camera.

A communication connection is established between the first device and the second device, and data may be directly transmitted between the first device and the second device.

In a possible implementation, communication may be established between the first device and the second device by using a DMSDP (English full name: distribute mobile sensing development platform; Chinese full name: distribute mobile sensing development platform) service. Specifically, camera interfaces that are provided by the DMSDP service and that are of the first device and the second device may be interconnected, to establish a scenario of an inter-device dual-view mode. A command and data may be transmitted between the first device and the second device by using the DMSDP service. The camera interface provided by the DMSDP service may be a CameraKit interface. Camera interface interconnection may be implemented by unifying camera programming interfaces of the first device and the second device as CameraKit interfaces.

After DMSDP communication is established, the first device and the second device may communicate with each other based on the DMSDP protocol. The DMSDP service may include a command pipeline and a data pipeline. The first device may send a configuration request to the second device by using the DMSDP service, where the configuration request is for obtaining a hardware parameter of an entity camera of the second device. Specifically, the first device may send the configuration request to the second device by using the command pipeline of the DMSDP service.

When receiving the configuration request, the second device may send, in response to the configuration request by using the DMSDP service, the hardware parameter of the entity camera of the second device to the first device in a form of a standard interface. For example, the second device may send the hardware parameter of the entity camera by using the data pipeline of the DMSDP service. The first device receives the hardware parameter of the entity camera of the second device by using the DMSDP service, obtains the hardware parameter of the entity camera of the second device by reading the standard interface, and locally configures a corresponding virtual camera based on the hardware parameter of the entity camera of the second device. Specifically, the hardware parameter may include a camera capability parameter of the entity camera. The first device may create, based on the camera capability parameter, a virtual camera hardware abstraction layer HAL (Hardware Abstraction Layer) and a camera framework that correspond to the entity camera, and add the camera framework to a distributed camera framework.

The virtual camera HAL is a hardware abstraction layer for the entity camera of the second device. The HAL is an interface layer between an operating system kernel and a hardware circuit, and manages, in a form of a module, each interface accessed by hardware. Each hardware module corresponds to a dynamic link library file. Therefore, the camera HAL is an access interface of the camera. The virtual camera HAL is accessed, and access is sent, by using the DMSDP service, to the entity camera corresponding to the virtual camera HAL, so that the corresponding entity camera can be accessed.

The camera capability parameter may include an aperture parameter, a focal length parameter, or the like of the camera, and may further include a high dynamic range HDR (High Dynamic Range) capability, a portrait capability, a super night capability, or the like. The virtual camera is created based on the hardware parameter of the entity camera, so that metadata of the entity camera can be fully synchronized, and that control of the local virtual camera is the same as remote control of the entity camera is ensured.

The first device may control, by controlling the virtual camera HAL, the entity camera that is of the second device and that corresponds to the virtual camera. For example, the first device may locally enable the virtual camera HAL, to turn on the corresponding entity camera of the second device for capturing, or may locally disable the virtual camera HAL, to turn off the corresponding entity camera of the second device.

In a possible implementation, the first device may locally include one virtual camera HAL or two or more virtual camera HALs, and one virtual camera HAL corresponds to one entity camera of the second device. For example, assuming that two or more entity cameras are carried on a vehicle, the first device may locally virtualize the two or more entity cameras, and create corresponding virtual camera HALs. Alternatively, the second device may be a mobile phone, and one virtual camera HAL in the first device corresponds to a plurality of entity cameras (which are a front camera and a rear camera) in the second device.

In a possible implementation, types of operating systems (Operating Systems, OSs for short) of the first device and the second device are not limited in this application. The first device may use an operating system such as an Android OS, a Harmony OS, or a Linux OS, and the second device may also use an operating system such as an Android OS, a Harmony OS, a Linux OS, or a Lite OS.

Figure 4:
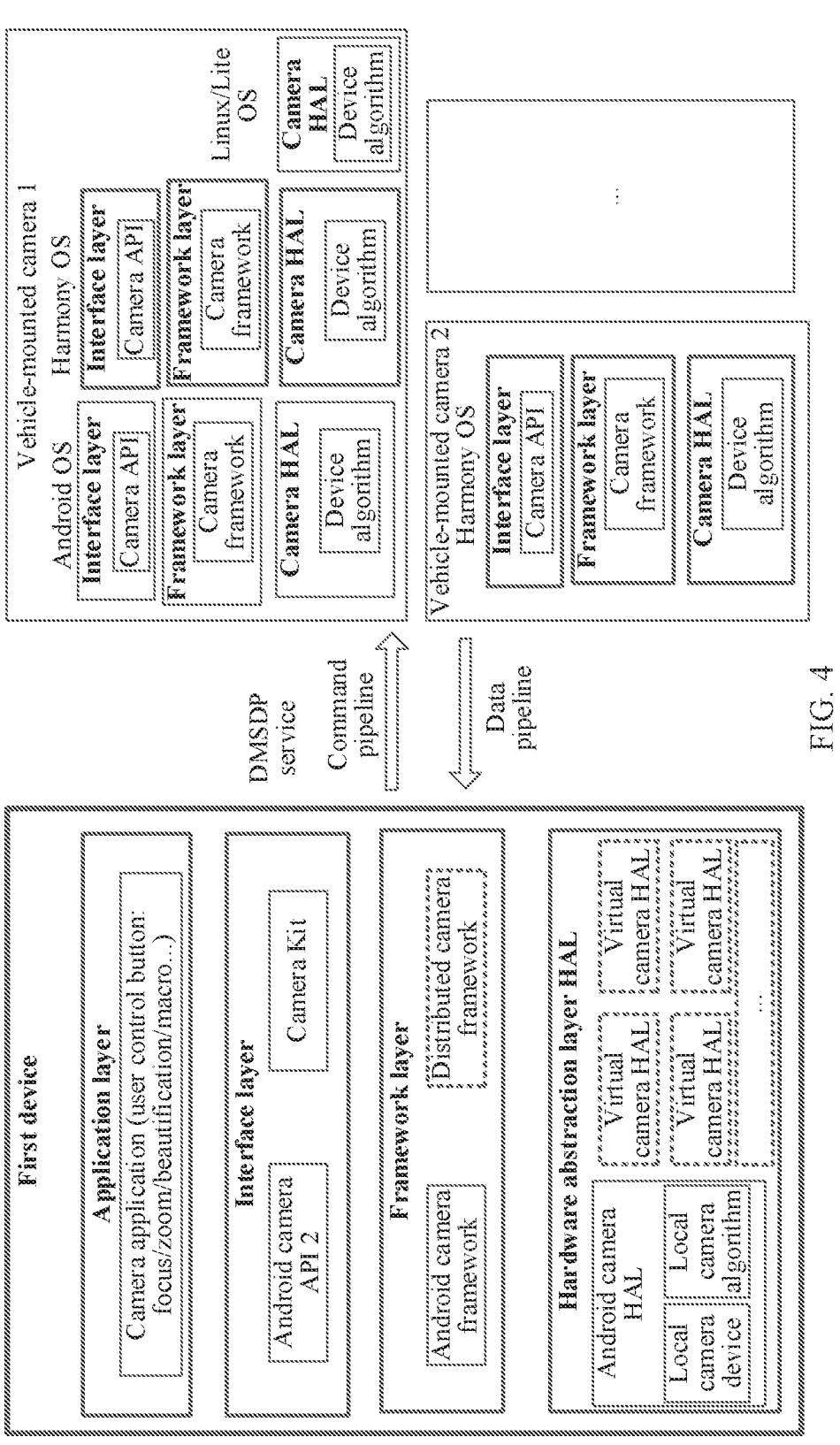
FIG. 4 is a block diagram of a device configuration in an application scenario according to an embodiment of this application.

FIG. 4 is a block diagram of a device configuration in an application scenario according to an embodiment of this application. As shown in FIG. 4, a first device may communicate with a plurality of second devices by using a DMSDP service. A plurality of virtual camera HALs may be configured in the first device, and one virtual camera HAL corresponds to one entity camera of the second device. The second device may include one or more entity cameras.

As shown in FIG. 4, in a possible implementation, a distributed camera framework may be further configured in the first device. When receiving a hardware parameter of the entity camera of the second device, the first device may further create a corresponding camera framework, and add the camera framework to the distributed camera framework. The distributed camera framework includes a plurality of camera frameworks corresponding to virtual camera HALs and a control module. The control module may be connected to the plurality of camera frameworks, and is responsible for dynamic pipeline control, device collaboration management, or the like.

The DMSDP service is established between the first device and the second device, and the virtual camera HAL of the entity camera of the second device is locally established in the first device, to simulate real ISP (Internet Service Provider, internet service provider) control, and implement an inter-device camera command and inter-device data. According to the configuration manner of the foregoing implementation of this application, the entity camera of the second device can be quickly controlled, and a current image that is around the first device and that is returned by the entity camera of the second device is obtained, so that an accurate road on which the first device is located can be accurately recognized based on the current image and road information that is obtained by a navigation application of the first device.

Figure 5:
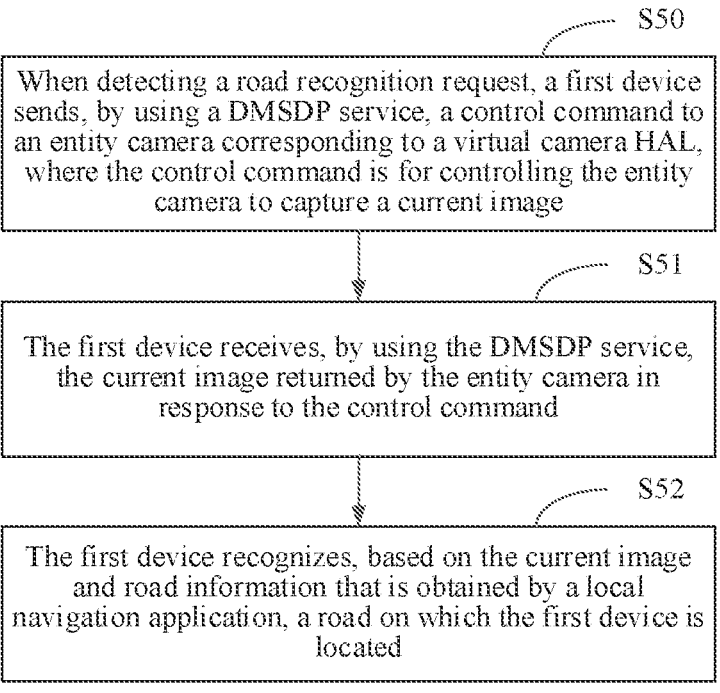
FIG. 5 is a flowchart of a road recognition method according to an embodiment of this application.

FIG. 5 is a flowchart of a road recognition method according to an embodiment of this application. As shown in FIG. 5, the road recognition method in this application may include the following steps.

Step S50: When detecting a road recognition request, a first device sends, by using a DMSDP service, a control command to an entity camera corresponding to a virtual camera HAL, where the control command is for controlling the entity camera to capture a current image.

Step S51: The first device receives, by using the DMSDP service, the current image returned by the entity camera in response to the control command.

Step S52: The first device recognizes, based on the current image and road information that is obtained by a local navigation application, a road on which the first device is located.

Figure 6A:
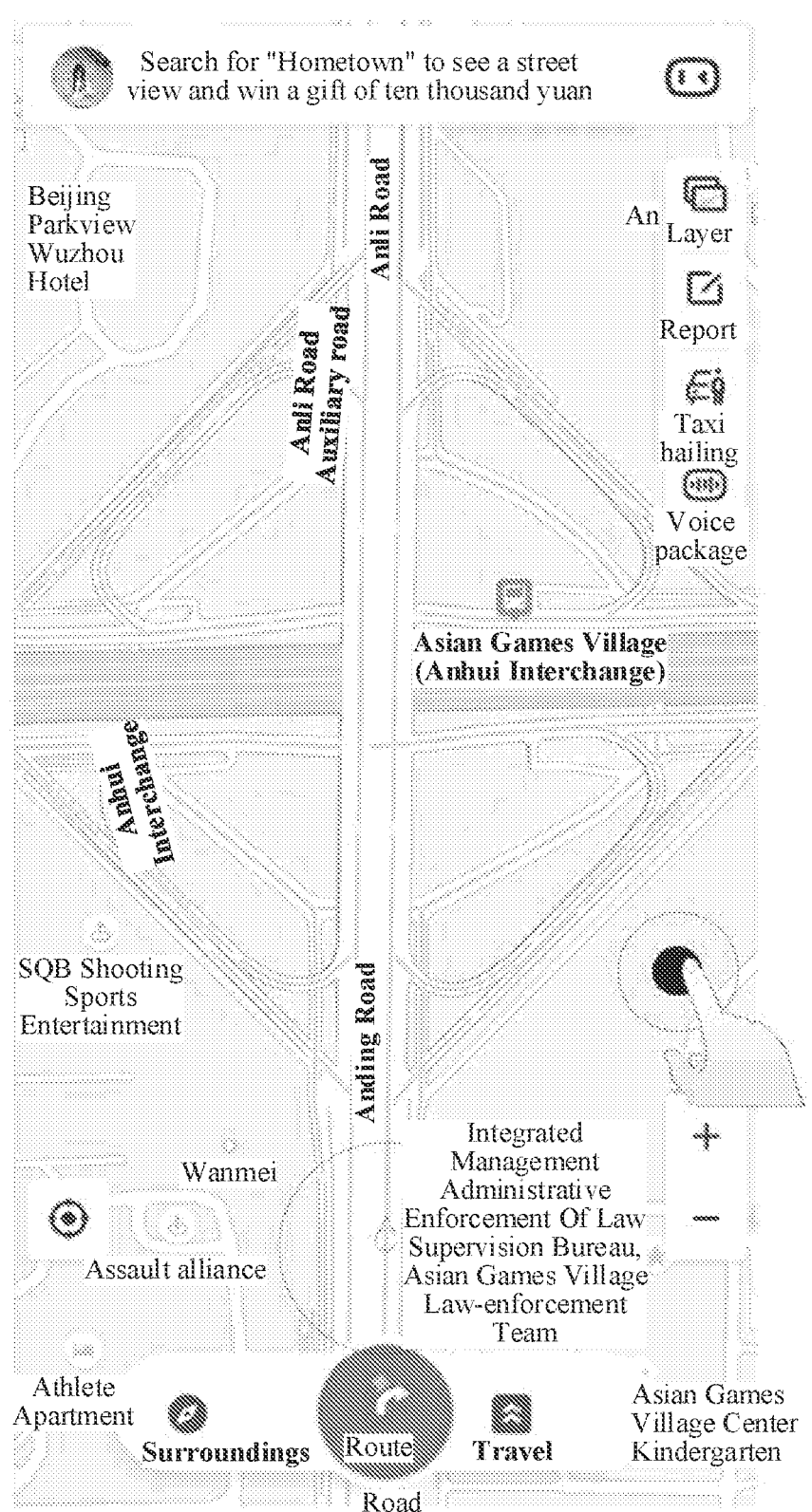
FIG. 6a and FIG. 6b each are a schematic diagram of a scenario in which a road recognition request is detected according to an example of this application.
Figure 6B:

The road recognition request may be triggered in a plurality of cases. In a possible implementation, when the navigation application of the first device runs, a road recognition control may be displayed on a display interface. When an operation of triggering the road recognition space is detected, the road recognition request may be generated, and the first device may detect the road recognition request. FIG. 6a and FIG. 6b each are a schematic diagram of a scenario in which a road recognition request is detected according to an example of this application. As shown in FIG. 6a, a road recognition control may be displayed on a display interface of an enabled navigation application. When a user is about to enter an interchange, because a road condition is complex, the user may manually tap the road recognition space to trigger road recognition. When detecting a trigger operation of the user, a first device may generate a road recognition request.

In the trigger method in the foregoing implementation, the user does not need to select specific road information, so that a navigation error caused by an incorrect subjective perception can be excluded, navigation can be correctly implemented, and a security risk caused by distraction when the user selects a road can be reduced to some extent.

In another possible implementation, the first device may preset, by using the navigation application, a road condition for which the road recognition request needs to be generated. In this way, when detecting that a road on which the first device is currently located satisfies the road condition, the first device generates the road recognition request, so that the road recognition request is detected. The road condition may be a road scenario in which the road recognition request needs to be generated. The road scenario may be a scenario such as being about to travel to an interchange, traveling on a road including a main road and an auxiliary road, or including a plurality of loop roads. As shown in FIG. 6b, a vehicle is at an interchange, and a road includes a plurality of roads such as a main road and an auxiliary road, where a road condition is complex. The first device may obtain, by using location information obtained through positioning and the road information obtained by the navigation application, a road scenario in which the device is located, and then determine, based on the road scenario, whether the road recognition request needs to be generated. If the road scenario in which the first device is currently located is consistent with the preset road scenario in which the road recognition request needs to be generated, that is, the preset road condition is satisfied, the first device may generate the road recognition request. For example, as shown in FIG. 6b, when the vehicle is about to travel to the interchange, the first device may automatically generate the road recognition request. For example, the first device may preset, in the navigation application, that the road recognition request is generated when the vehicle is traveling toward a direction of the interchange and a distance between the vehicle and the interchange is less than a distance threshold.

According to the trigger method in the foregoing implementation, navigation can be correctly implemented without any operation performed by the user, so that a security risk can be eliminated.

As shown in FIG. 4, in a possible implementation, the first device may deliver the control command to the plurality of virtual camera HALs by using the distributed camera framework, and control, by controlling the plurality of virtual camera HALs, the entity cameras corresponding to the virtual camera HALs. The control command may include a process such as turning on a camera, capturing, or turning off a camera. When receiving the control command, the virtual camera HAL of the first device may send, based on the control command, a sub-control command, for example, a turning-on command or a capturing command, to the entity camera corresponding to the virtual camera HAL.

As shown in FIG. 4, the DMSDP service may include a command pipeline and a data pipeline. The command pipeline is for transmitting the control command, and the data pipeline is for transmitting image data. Therefore, the first device may send, by using the command pipeline of the DMSDP service, the control command to the entity camera corresponding to the virtual camera.

Figure 7:
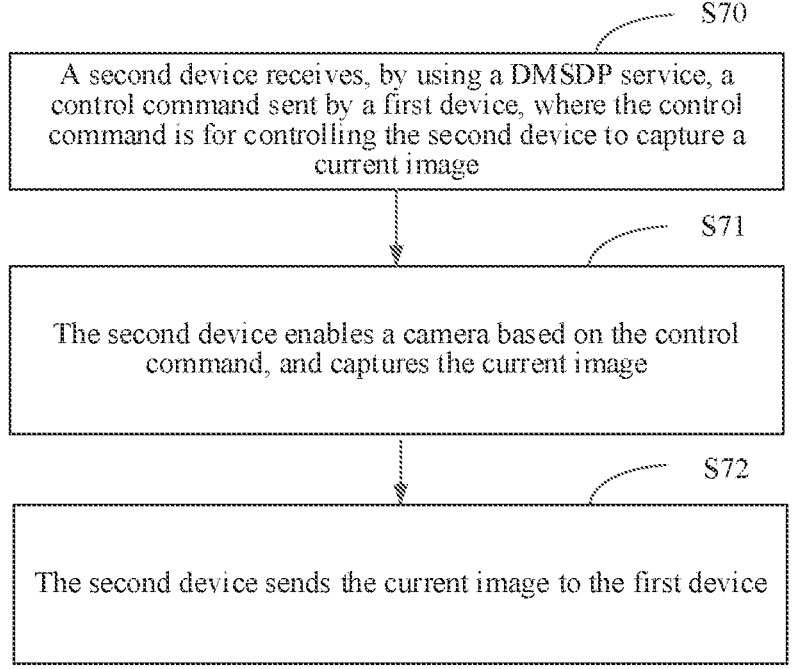
FIG. 7 is a flowchart of an image obtaining method according to an embodiment of this application.

The entity camera of the second device receives the control command by using the DMSDP service, and controls the local entity camera based on the control command. FIG. 7 is a flowchart of an image obtaining method according to an embodiment of this application. As shown in FIG. 7, the method may include the following steps.

Step S70: A second device receives, by using a DMSDP service, a control command sent by a first device, where the control command is for controlling the second device to capture a current image.

Step S71: The second device enables a camera based on the control command, and captures the current image.

Step S72: The second device sends the current image to the first device.

After receiving the control command by using the DMSDP server, the second device may invoke a camera API (Application Programming Interface, application programming interface) interface based on the control command, deliver the control command to a camera HAL by using a camera framework, and control an operation such as enabling, capturing, or disabling of an entity camera by using the camera HAL.

After capturing the current image, the second device may send the current image to the first device by using a data pipeline of the DMSDP service. Therefore, the first device may receive, by using the data pipeline of the DMSDP service, the current image returned by the entity camera in response to the control command.

Because a plurality of virtual camera HALs are included, in other words, the first device may obtain the current image from a plurality of entity cameras, after receiving a plurality of current images, the first device recognizes, based on the plurality of current images and road information that is obtained by a local navigation application, a road on which the first device is located.

In a possible implementation, after receiving the current image returned by the corresponding entity camera, the virtual camera HAL of the first device may send the current image to a camera HAL of a local camera, and the camera HAL of the local camera splices the plurality of current images by using a camera algorithm, to obtain a spliced image. The local virtual camera HAL stores only a camera capability of the corresponding entity camera, and does not include the camera algorithm. Therefore, after receiving the current image, the virtual camera HAL of the first device may send the current image to the camera HAL of the local camera, and the camera HAL of the local camera splices the current images by using the camera algorithm.

After obtaining the spliced image, the camera HAL of the local camera may transmit the spliced image to the local navigation application, and the local navigation application of the first device recognizes, based on the spliced image and the road information that is obtained by the navigation application, the specific road on which the first device is located. The navigation application may obtain the road information from a cloud server.

The road recognition method in this embodiment of this application can implement communication between a mobile phone and a plurality of vehicle-mounted cameras. The mobile phone controls the vehicle-mounted camera to capture a current image around a vehicle and send the current image back to the mobile phone. The mobile phone determines accurate road information based on the current image and road information that is obtained by a navigation application. According to the road recognition method in this implementation of this application, in comparison with vehicle-mounted navigation in a conventional technology, an accurate road can be positioned based on a real-time image around a vehicle, and navigation can still be correctly performed when a road condition is complex. In comparison with a navigation application in a terminal, the accurate road can also be positioned based on the real-time image around the vehicle, and a user does not need to manually select specific road information, so that navigation can be correctly implemented, and a security risk can be eliminated.

FIG. 8 is a flowchart of a road recognition method according to an embodiment of this application. As shown in FIG. 8, the method further includes the following steps.

Step S80: A first device obtains a hardware parameter of an entity camera by using a DMSDP service.

Step S81: The first device locally configures a corresponding virtual camera based on the hardware parameter of the entity camera.

Step S82: When detecting a road recognition request, the first device sends, by using the DMSDP service, a control command to the entity camera corresponding to a virtual camera HAL, where the control command is for controlling the entity camera to capture a current image.

Step S83: The first device receives, by using the DMSDP service, the current image returned by the entity camera in response to the control command.

Step S84: The first device recognizes, based on the current image and road information that is obtained by a local navigation application, a road on which the first device is located.

The hardware parameter includes a camera capability parameter of the entity camera. Step S81 may include: The first device creates, based on the camera capability parameter, the virtual camera hardware abstraction layer HAL and a camera framework that correspond to the entity camera, and adds the camera framework to a distributed camera framework. For a specific process, refer to the foregoing specific descriptions of the configuration part. Details are not described again.

For steps S82 to S84, refer to descriptions of steps S50 to S52. Details are not described again.

Application Example

Figure 9:
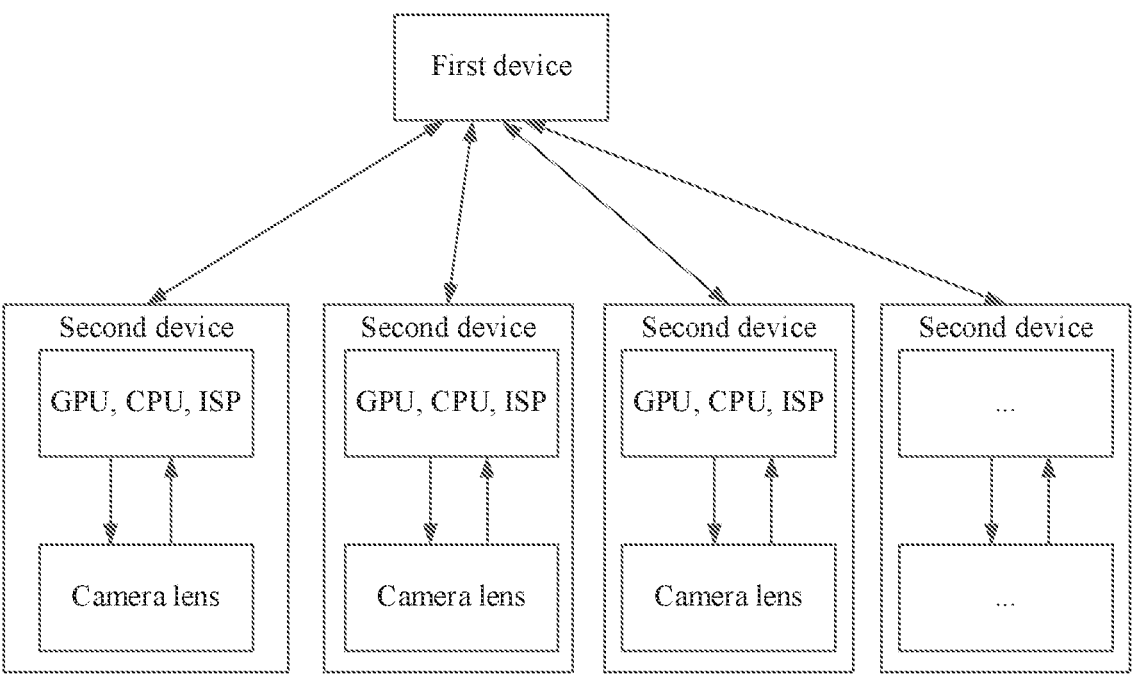
FIG. 9 is a schematic diagram of an application scenario according to an embodiment of this application.
Figure 10:
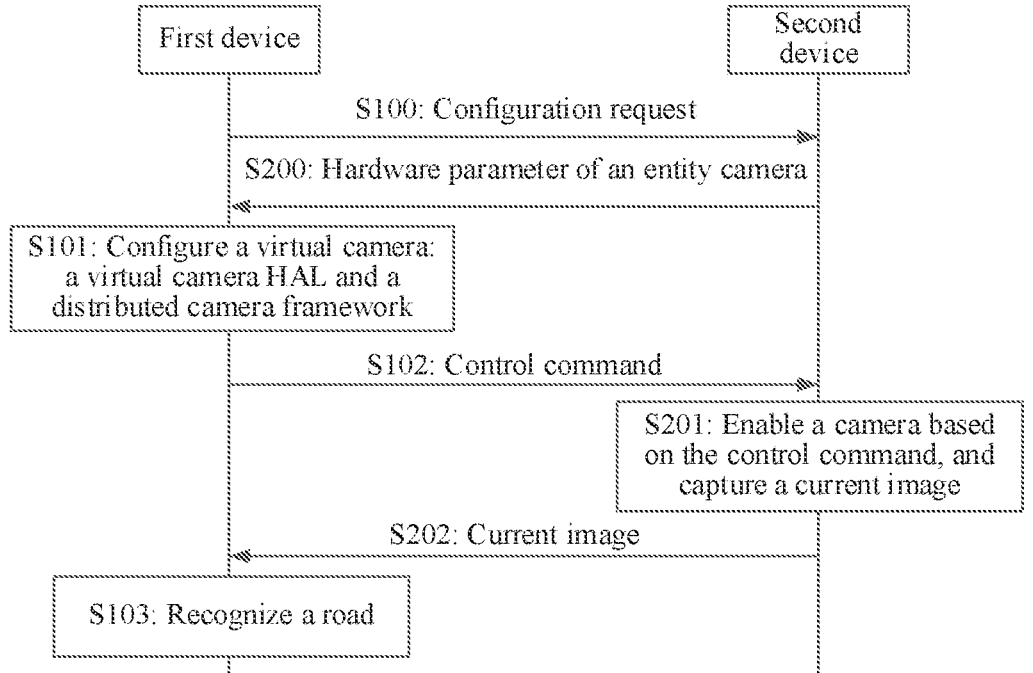
FIG. 10 is a diagram of interaction between a first device and a second device according to an embodiment of this application.

FIG. 9 is a schematic diagram of an application scenario according to an embodiment of this application. FIG. 10 is a diagram of interaction between a first device and a second device according to an embodiment of this application. With reference to FIG. 9 and FIG. 10, the road recognition method in this application is further described.

As shown in FIG. 9, a first device may communicate with a plurality of second devices, and a camera is mounted on the second device. In a possible application scenario, the first device may be a mobile phone, and the second device may be a vehicle-mounted camera. A user drives a vehicle in the vehicle, performs navigation by using the first device, and accurately recognizes a road based on a current image captured by the vehicle-mounted camera.

Before road recognition is enabled, camera programming interfaces of the first device and the second device may be unified as CameraKit interfaces, so that camera interfaces that are provided by a DMSDP service and that are of the first device and the second device may be interconnected, and communication is established between the first device and the second device. Then, as shown in FIG. 10, the first device sends a configuration request to the second device (S100). After receiving the configuration request, the second device sends a hardware parameter of an entity camera to the first device in a form of a standard interface (S200). After receiving the hardware parameter, the first device may configure, based on the hardware parameter, a virtual camera corresponding to the entity camera. The following is specifically included: The first device creates, based on a camera capability parameter, a virtual camera HAL and a camera framework that correspond to the entity camera (S101).

After creating the virtual camera corresponding to the entity camera, the first device may control the corresponding entity camera by controlling the virtual camera. In a navigation process, the first device may control the entity camera to capture a current image around a vehicle body. A navigation application of the first device may recognize, based on the current image and road information that is obtained by the navigation application, a road on which the vehicle body is located. As shown in FIG. 10, the following steps may be specifically included.

When detecting a road recognition request, the first device sends, by using the DMSDP service, a control command to the entity camera corresponding to the virtual camera HAL (S102). The second device enables a camera based on the control command, and captures the current image (S201). The second device sends the current image to the first device (S202).

After receiving the current image, the first device recognizes, based on the current image and the road information that is obtained by the local navigation application, the road on which the first device is located (S103). Specifically, as shown in FIG. 9, after vehicle-mounted cameras located in a plurality of directions such as the front, the rear, the left, and the right of a vehicle enable cameras based on a control command and capture current images, the vehicle-mounted cameras send the current images to the first device. The first device receives the current images in the plurality of directions, and may splice the current images in the plurality of directions, to obtain a spliced image. The spliced image may be a panoramic image. The navigation application of the first device may recognize an accurate road based on the spliced image and the road information that is obtained by the navigation application, for example, determine whether the road is a road on or under an interchange, a location of the road in a plurality of lanes, or whether the road is a main road or an auxiliary road.

Figure 11:
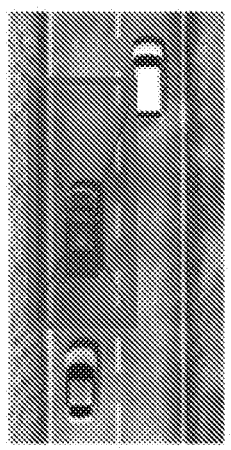
FIG. 11 is a schematic diagram of a road recognition result according to an embodiment of this application.

FIG. 11 is a schematic diagram of a road recognition result according to an embodiment of this application. As shown in FIG. 11, based on a panoramic image and road information that is obtained through navigation, it may be determined that a vehicle is on a lane on the left.

In the road recognition method in this application, camera processing capabilities of different devices are combined based on a distributed camera device virtualization technology, to form a camera data center including a device such as a mobile phone connected to a vehicle. In addition, camera data flows obtained by the devices are analyzed based on road information that is obtained by navigation software, to determine a location of a road on which the current vehicle is located, so that a user experience of a vehicle owner is improved.

Figure 12:
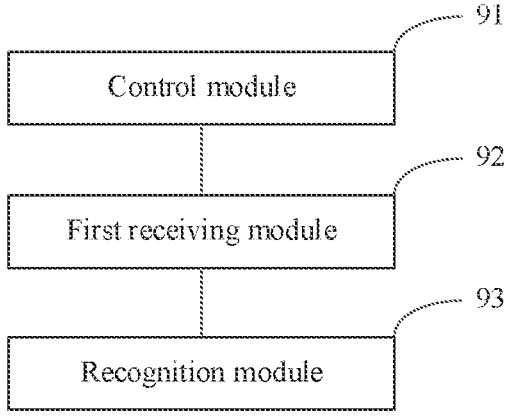
FIG. 12 is a block diagram of a road recognition apparatus according to an embodiment of this application.

This application further provides a road recognition apparatus. FIG. 12 is a block diagram of a road recognition apparatus according to an embodiment of this application. The road recognition apparatus provided in an implementation of this application may be used in a first device, and the first device includes two or more virtual camera HALs. As shown in FIG. 12, the road recognition apparatus provided in the implementation of this application may include:

a control module 91, configured to: when detecting a road recognition request, send, by using a DMSDP service, a control command to an entity camera corresponding to the virtual camera HAL, where the control command is for controlling the entity camera to capture a current image;

a first receiving module 92, configured to receive, by using the DMSDP service, the current image returned by the entity camera in response to the control command; and a recognition module 93, configured to recognize, based on the current image and road information that is obtained by a local navigation application, a road on which the first device is located.

In a possible implementation, the apparatus further includes:

an obtaining module, configured to obtain a hardware parameter of the entity camera by using the DMSDP service; and a configuration module, configured to locally configure a corresponding virtual camera based on the hardware parameter of the entity camera.

In a possible implementation, the hardware parameter includes a camera capability parameter of the entity camera. The configuration module includes: a configuration unit, configured to create, based on the camera capability parameter, a virtual camera hardware abstraction layer HAL and a camera framework that correspond to the entity camera, and add the camera framework to a distributed camera framework.

In a possible implementation, the DMSDP service includes a command pipeline and a data pipeline.

The control module 91 includes a control unit, configured to send, by using the command pipeline of the DMSDP service, the control command to the entity camera corresponding to the virtual camera.

The first receiving module 92 includes a receiving unit, configured to receive, by using the data pipeline of the DMSDP service, the current image returned by the entity camera in response to the control command.

In a possible implementation, the recognition module 93 includes:

a splicing unit, configured to splice a plurality of current images by using a camera HAL of a local camera, to obtain a spliced image; and a recognition unit, configured to recognize, by using the navigation application based on the spliced image and the road information that is obtained by the navigation application, the road on which the first device is located.

In a possible implementation, the entity camera is a vehicle-mounted camera.

Figure 13:
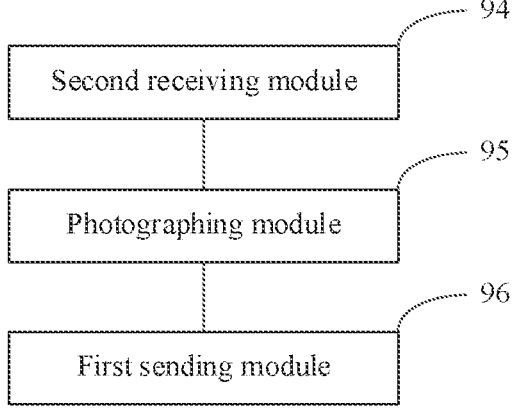
FIG. 13 is a block diagram of an image obtaining apparatus according to an embodiment of this application.

This application further provides an image obtaining apparatus. The image obtaining apparatus may be used in a second device. FIG. 13 is a block diagram of an image obtaining apparatus according to an embodiment of this application. As shown in FIG. 13, the apparatus includes:

a second receiving module 94, configured to receive, by using a DMSDP service, a control command sent by a first device, where the control command is for controlling a second device to capture a current image;

a photographing module 95, configured to enable a camera based on the control command, and capture the current image; and a first sending module 96, configured to send the current image to the first device.

In a possible implementation, the apparatus further includes:

a second sending module, configured to: when receiving a configuration request sent by the first device, send a hardware parameter of an entity camera of the second device to the first device by using the DMSDP service.

FIG. 14 is a schematic diagram of a structure of a terminal device according to an embodiment of this application. For example, the terminal device is a mobile phone. FIG. 14 is a schematic diagram of a structure of a mobile phone 200.

The mobile phone 200 may include a processor 210, an external memory interface 220, an internal memory 221, a USB interface 230, a charging management module 240, a power management module 241, a battery 242, an antenna 1, an antenna 2, a mobile communication module 251, a wireless communication module 252, an audio module 270, a speaker 270A, a receiver 270B, a microphone 270C, a headset jack 270D, a sensor module 280, a button 290, a motor 291, an indicator 292, a camera 293, a display 294, a SIM card interface 295, and the like. The sensor module 280 may include a gyroscope sensor 280A, an acceleration sensor 280B, an optical proximity sensor 280G, a fingerprint sensor 280H, and a touch sensor 280K (certainly, the mobile phone 200 may further include other sensors such as a temperature sensor, a pressure sensor, a distance sensor, a magnetic sensor, an ambient light sensor, a barometric pressure sensor, and a bone conduction sensor, which are not shown in the figure).

It may be understood that an illustrated structure in this embodiment of this application does not constitute a specific limitation on the mobile phone 200. In some other embodiments of this application, the mobile phone 200 may include more or fewer components than those shown in the figure, combine some components, divide some components, or have different component arrangements. The components shown in the figure may be implemented by hardware, software, or a combination of software and hardware.

The processor 210 may include one or more processing units. For example, the processor 210 may include an application processor (application processor, AP), a modem processor, a graphics processing unit (graphics processing unit, GPU), an image signal processor (image signal processor, ISP), a controller, a memory, a video codec, a digital signal processor (digital signal processor, DSP), a baseband processor, and/or a neural network processing unit (Neural network Processing Unit, NPU). Different processing units may be independent components, or may be integrated into one or more processors. The controller may be a nerve center and a command center of the mobile phone 200. The controller may generate an operation control signal based on instruction operation code and a time sequence signal, to complete control of instruction reading and instruction execution.

A memory may be further disposed in the processor 210, and is configured to store instructions and data. In some embodiments, the memory in the processor 210 is a cache. The memory may store instructions or data that has been used or cyclically used by the processor 210. If the processor 210 needs to use the instructions or the data again, the processor 210 may directly invoke the instructions or the data from the memory. This avoids repeated access and reduces waiting time of the processor 210, thereby improving system efficiency.

The processor 210 may run the road recognition method provided in embodiments of this application, so that navigation can still be correctly performed without user manual selection when a road condition is complex, so that navigation can be correctly implemented, and a security risk can be eliminated. The processor 210 may include different components. For example, when a CPU and a GPU are integrated, the CPU and the GPU may cooperate to perform the road recognition method provided in embodiments of this application. For example, in the road recognition method, some algorithms are executed by the CPU, and other algorithms are executed by the GPU, to obtain high processing efficiency.

The display 294 is configured to display an image, a video, and the like. The display 294 includes a display panel. The display panel may be a liquid crystal display (liquid crystal display, LCD), an organic light-emitting diode (organic light-emitting diode, OLED), an active-matrix organic light emitting diode (active-matrix organic light-emitting diode, AMOLED), a flexible light-emitting diode (flexible light-emitting diode, FLED), a mini-LED, a micro-LED, a micro-OLED, quantum dot light emitting diodes (quantum dot light emitting diode, QLED), or the like. In some embodiments, the mobile phone 200 may include one or N displays 294, where N is a positive integer greater than 1. The display 294 may be configured to display information input by a user or information provided to a user, and various graphical user interfaces (graphical user interfaces, GUIs). For example, the display 294 may display a photo, a video, a web page, a file, or the like. For another example, the display 294 may display a graphical user interface. The graphical user interface includes a status bar, a navigation bar that can be hidden, a time and weather widget (widget), and an application icon, for example, a browser icon. The status bar includes an operator name (for example, China Mobile), a mobile network (for example, 4G), time, and a battery level. The navigation bar includes an icon of a back (back) button, an icon of a home (home) button, and an icon of a forward button. In addition, it may be understood that, in some embodiments, the status bar may further include a Bluetooth icon, a Wi-Fi icon, an icon of an externally-connected device, and the like. It may be further understood that, in some other embodiments, the graphical user interface may further include a dock bar, and the dock bar may include an icon of a frequently-used application and the like. After the processor 210 detects a touch event of a user on an application icon by using a finger (a stylus or the like), in response to the touch event, the processor 210 starts a user interface of an application corresponding to the application icon, and displays the user interface of the application on the display 294.

In this embodiment of this application, the display 294 may be one integrated flexible display, or may be a spliced display including two rigid screens and one flexible screen located between the two rigid screens.

After the processor 210 performs the road recognition method provided in embodiments of this application, the terminal device may establish a connection to another terminal device by using the antenna 1, the antenna 2, or the USB interface, transmit data according to the road recognition method provided in embodiments of this application, and control the display 294 to display a corresponding graphical user interface.

The camera 293 (which may be a front-facing camera, a rear-facing camera, or a camera that may serve as both a front-facing camera and a rear-facing camera) is configured to capture a static image or a video. Usually, the camera 293 may include a photosensitive element such as a lens group and an image sensor. The lens group includes a plurality of lenses (convex lenses or concave lenses), and is configured to: collect an optical signal reflected by a to-be-photographed object, and transfer the collected optical signal to the image sensor. The image sensor generates an original image of the to-be-photographed object based on the optical signal.

The internal memory 221 may be configured to store computer-executable program code, and the executable program code includes instructions. The processor 210 runs the instructions stored in the internal memory 221, to implement various function applications and data processing of the mobile phone 200. The internal memory 221 may include a program storage area and a data storage area. The program storage area may store code of an operating system, an application (for example, a camera application or a WeChat application), and the like. The data storage area may store data (for example, an image or a video collected by the camera application) and the like that are created during use of the mobile phone 200.

The internal memory 221 may further store one or more computer programs 1310 corresponding to the road recognition method provided in embodiments of this application. The one or more computer programs 1310 are stored in the memory 221 and are configured to be executed by the one or more processors 210. The one or more computer programs 1310 include instructions, and the instructions may be used to perform steps in embodiments corresponding to FIG. 5 and FIG. 8. The computer program 1310 may include the control module 91, the first receiving module 92, and the recognition module 93. The control module 91 is configured to: when detecting a road recognition request, send, by using a DMSDP service, a control command to an entity camera corresponding to a virtual camera HAL, where the control command is for controlling the entity camera to capture a current image. The first receiving module 92 is configured to receive, by using the DMSDP service, the current image returned by the entity camera in response to the control command. The recognition module 93 is configured to recognize, based on the current image and road information that is obtained by a local navigation application, a road on which the first device is located.

In addition, the internal memory 221 may include a high-speed random access memory, and may further include a non-volatile memory, for example, at least one magnetic disk storage device, a flash memory device, or a universal flash memory (universal flash storage, UFS).

Certainly, code corresponding to the road recognition method provided in embodiments of this application may alternatively be stored in an external memory. In this case, the processor 210 may run, by using the external memory interface 220, the code of the road recognition method stored in the external memory.

The following describes functions of the sensor module 280.

The gyroscope sensor 280A may be configured to determine a motion posture of the mobile phone 200. In some embodiments, angular velocities of the mobile phone 200 around three axes (namely, axes x, y, and z) may be determined by using the gyroscope sensor 280A in other words, the gyroscope sensor 280A may be configured to detect a current motion status of the mobile phone 200, for example, a shaking state or a static state.

When the display in this embodiment of this application is a foldable screen, the gyroscope sensor 280A may be configured to detect a folding or unfolding operation performed on the display 294. The gyroscope sensor 280A may report the detected folding or unfolding operation as an event to the processor 210, to determine whether the display 294 is in a folded state or an unfolded state.

The acceleration sensor 280B may detect magnitudes of accelerations in various directions (usually on three axes) of the mobile phone 200. In other words, the gyroscope sensor 280A may be configured to detect a current motion status of the mobile phone 200, for example, a shaking state or a static state. When the display in this embodiment of this application is a foldable screen, the acceleration sensor 280B may be configured to detect a folding or unfolding operation performed on the display 294. The acceleration sensor 280B may report the detected folding or unfolding operation as an event to the processor 210, to determine whether the display 294 is in a folded state or an unfolded state.

The optical proximity sensor 280G may include a light emitting diode (LED) and an optical detector, for example, a photodiode. The light emitting diode may be an infrared light emitting diode. The mobile phone emits infrared light by using the light emitting diode. The mobile phone detects infrared reflected light from a nearby object by using the photodiode. When sufficient reflected light is detected, the mobile phone may determine that there is an object near the mobile phone. When insufficient reflected light is detected, the mobile phone may determine that there is no object near the mobile phone. When the display in this embodiment of this application is a foldable screen, the optical proximity sensor 280G may be disposed on a first screen of the foldable display 294, and the optical proximity sensor 280G may detect a magnitude of an angle between the first screen and a second screen in a folded or unfolded state based on an optical path difference between infrared signals.

The gyroscope sensor 280A (or the acceleration sensor 280B) may send detected motion status information (for example, the angular velocity) to the processor 210. The processor 210 determines, based on the motion status information, whether the mobile phone is currently in a handheld state or a tripod state (for example, when the angular velocity is not 0, it indicates that the mobile phone 200 is in the handheld state).

The fingerprint sensor 280H is configured to collect a fingerprint. The mobile phone 200 may use a feature of the collected fingerprint to implement fingerprint-based unlocking, application lock access, fingerprint-based photographing, fingerprint-based call answering, and the like.

The touch sensor 280K is also referred to as a "touch panel". The touch sensor 280K may be disposed in the display 294, and the touch sensor 280K and the display 294 form a touchscreen, which is also referred to as a "touch control screen". The touch sensor 280K is configured to detect a touch operation performed on or near the touch sensor 280K. The touch sensor may transfer the detected touch operation to the application processor to determine a type of the touch event. Visual output related to the touch operation may be provided by using the display 294. In some other embodiments, the touch sensor 280K may alternatively be disposed on a surface of the mobile phone 200 at a location different from that of the display 294.

For example, the display 294 of the mobile phone 200 displays a home screen, and the home screen includes icons of a plurality of applications (for example, a camera application and a WeChat application). The user taps an icon of the camera application on the home screen via the touch sensor 280K, to trigger the processor 210 to start the camera application and turn on the camera 293. The display 294 displays an interface of the camera application, for example, a viewfinder interface.

A wireless communication function of the mobile phone 200 may be implemented by using the antenna 1, the antenna 2, the mobile communication module 251, the wireless communication module 252, the modem processor, the baseband processor, and the like.

The antenna 1 and the antenna 2 are configured to transmit and receive an electromagnetic wave signal. Each antenna in the mobile phone 200 may be configured to cover one or more communication bands. Different antennas may be further multiplexed, to improve antenna utilization. For example, the antenna 1 may be multiplexed as a diversity antenna of a wireless local area network. In some other embodiments, the antenna may be used in combination with a tuning switch.

The mobile communication module 251 may provide a solution that is applied to the mobile phone 200 and that includes wireless communication such as 2G, 3G, 4G, and 5G. The mobile communication module 251 may include at least one filter, a switch, a power amplifier, a low noise amplifier (low noise amplifier, LNA), and the like. The mobile communication module 251 may receive an electromagnetic wave through the antenna 1, perform processing such as filtering or amplification on the received electromagnetic wave, and transmit the electromagnetic wave to the modem processor for demodulation. The mobile communication module 251 may further amplify a signal modulated by the modem processor, and convert, by using the antenna 1, the signal into an electromagnetic wave for radiation. In some embodiments, at least some functional modules in the mobile communication module 251 may be disposed in the processor 210. In some embodiments, at least some function modules of the mobile communication module 251 may be disposed in a same device with at least some modules of the processor 210. In this embodiment of this application, the mobile communication module 251 may alternatively be configured to perform information exchange with another terminal device.

The modem processor may include a modulator and a demodulator. The modulator is configured to modulate a to-be-sent low-frequency baseband signal into a medium-high frequency signal. The demodulator is configured to demodulate a received electromagnetic wave signal into a low-frequency baseband signal. Then, the demodulator transmits the low-frequency baseband signal obtained through demodulation to the baseband processor for processing. The low-frequency baseband signal is processed by the baseband processor and then transmitted to the application processor. The application processor outputs a sound signal by using an audio device (not limited to the speaker 270A, the receiver 270B, or the like), or displays an image or a video by using the display 294. In some embodiments, the modem processor may be an independent component. In some other embodiments, the modem processor may be independent of the processor 210, and is disposed in a same device as the mobile communication module 251 or another function module.

The wireless communication module 252 may provide a solution that is applied to the mobile phone 200 and that includes wireless communication such as a wireless local area network (wireless local area network, WLAN) (for example, a wireless fidelity (wireless fidelity, Wi-Fi) network). Bluetooth (Bluetooth, BT), a global navigation satellite system (global navigation satellite system. GNSS), frequency modulation (frequency modulation, FM), near field communication (near field communication, NFC), and an infrared (infrared, IR) technology. The wireless communication module 252 may be one or more components integrating at least one communication processing module. The wireless communication module 252 receives an electromagnetic wave by using the antenna 2, performs frequency modulation and filtering processing on an electromagnetic wave signal, and sends the processed signal to the processor 210. The wireless communication module 252 may further receive a to-be-sent signal from the processor 210, perform frequency modulation and amplification on the to-be-sent signal, and convert, by using the antenna 2, the signal into an electromagnetic wave for radiation.

In addition, the mobile phone 200 may implement an audio function, for example, music playing and recording, by using the audio module 270, the speaker 270A, the receiver 270B, the microphone 270C, the headset jack 270D, the application processor, and the like. The mobile phone 200 may receive an input from the button 290, and generate a button signal input related to a user setting and function control of the mobile phone 200. The mobile phone 200 may generate a vibration prompt (for example, an incoming call vibration prompt) by using the motor 291. The indicator 292 in the mobile phone 200 may be an indicator light, may be configured to indicate a charging status and a power change, or may be configured to indicate a message, a missed call, a notification, and the like. The SIM card interface 295 in the mobile phone 200 is configured to connect to a SIM card. A SIM card may be inserted into the SIM card interface 295 or removed from the SIM card interface 295, to implement contact with or separation from the mobile phone 200.

It should be understood that during actual application, the mobile phone 200 may include more or fewer components than those shown in FIG. 14. This is not limited in this embodiment of this application. The mobile phone 200 shown in the figure is merely an example, and the mobile phone 200 may have more or fewer components than those shown in the figure, two or more components may be combined, or different component configurations may be used. Various components shown in the figure may be implemented in hardware including one or more signal processing and/or application-specific integrated circuits, software, or a combination of hardware and software.

A software system of a terminal device may use a layered architecture, an event-driven architecture, a microkernel architecture, a micro service architecture, or a cloud architecture. In embodiments of this application, an Android system with a layered architecture is used as an example to describe a software structure of the terminal device.

Figure 15:
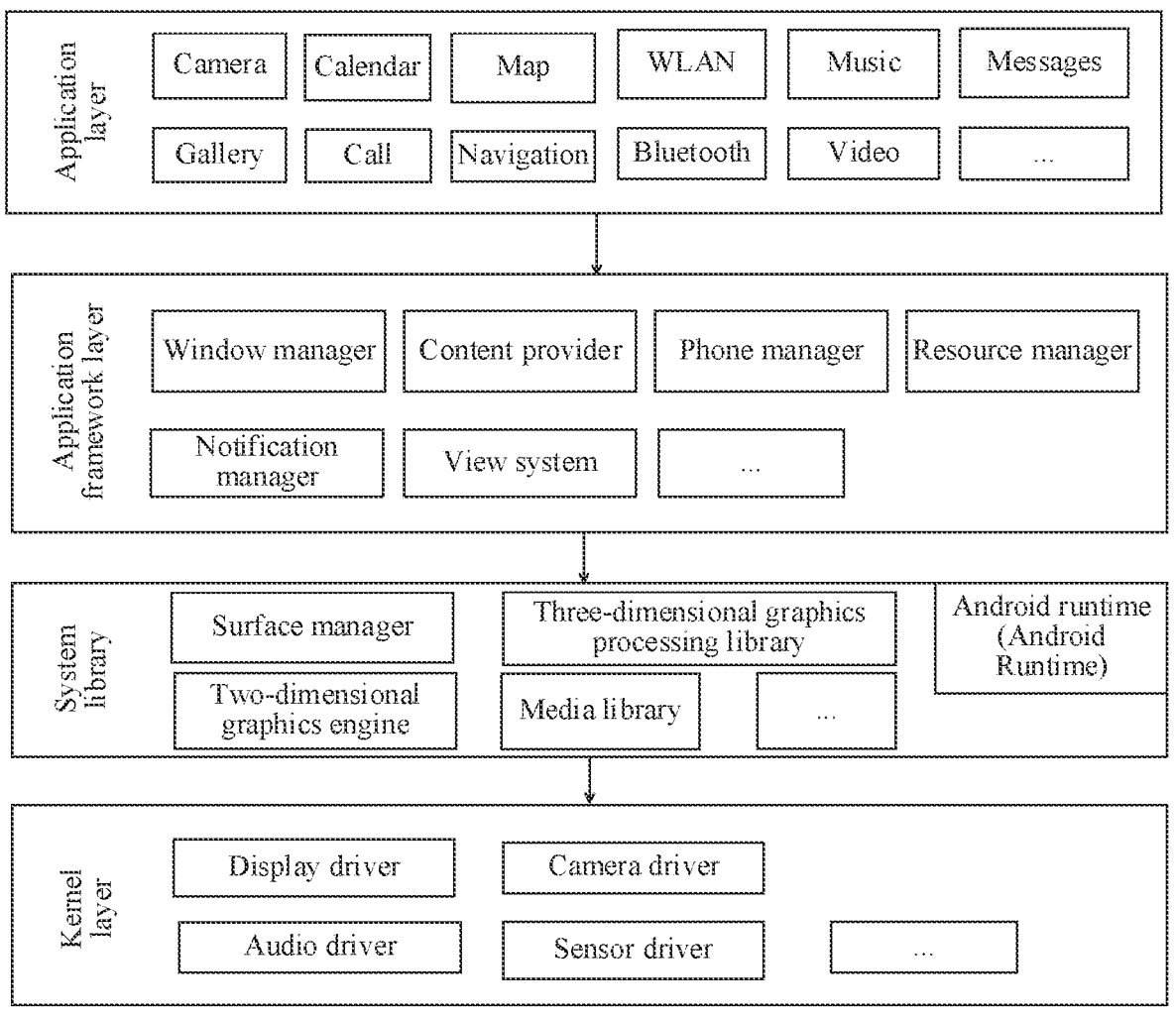
FIG. 15 is a block diagram of a software structure of a terminal device according to an embodiment of this application.

FIG. 15 is a block diagram of a software structure of a terminal device according to an embodiment of this application.

In a layered architecture, software is divided into several layers, and each layer has a clear role and task. The layers communicate with each other through a software interface. In some embodiments, an Android system is divided into four layers: an application layer, an application framework layer, an Android runtime (Android runtime) and system library, and a kernel layer from top to bottom.

The application layer may include a series of application packages.

As shown in FIG. 15, the application packages may include applications such as Phone, Camera, Gallery, Calendar, Call, Map, Navigation, WLAN, Bluetooth. Music, Video, and Messages.

The application framework layer provides an application programming interface (application programming interface, API) and a programming framework for an application at the application layer. The application framework layer includes some predefined functions.

As shown in FIG. 15, the application framework layer may include a window manager, a content provider, a view system, a phone manager, a resource manager, a notification manager, and the like.

The window manager is configured to manage a window program. The window manager may obtain a size of the display, determine whether there is a status bar, perform screen locking, take a screenshot, and the like.

The content provider is configured to: store and obtain data, and enable the data to be accessed by an application program. The data may include a video, an image, an audio, calls that are made and answered, a browsing history and bookmarks, an address book, and the like.

The view system includes visual controls such as a control for displaying a text and a control for displaying an image. The view system may be configured to construct an application program. A display interface may include one or more views. For example, a display interface including an SMS message notification icon may include a text display view and an image display view.

The phone manager is configured to provide a communication function of the terminal device, for example, management of call statuses (including answering, declining, and the like).

The resource manager provides various resources such as a localized character string, an icon, an image, a layout file, and a video file for an application program.

The notification manager enables an application program to display notification information in a status bar, and may be configured to convey a notification message. The notification manager may automatically disappear after a short pause without requiring a user interaction. For example, the notification manager is configured to notify download completion, give a message notification, and the like. The notification manager may alternatively be a notification that appears in a top status bar of the system in a form of a graph or a scroll bar text, for example, a notification of an application that is run on a background, or may be a notification that appears on the screen in a form of a dialog window. For example, text information is displayed in the status bar, an announcement is given, the terminal device vibrates, or an indicator light blinks.

The Android runtime includes a kernel library and a virtual machine. The Android runtime is responsible for scheduling and management of the Android system.

The kernel library includes two parts: a function that needs to be called in Java language and a kernel library of Android.

The application layer and the application framework layer run on the virtual machine. The virtual machine executes java files of the application layer and the application framework layer as binary files. The virtual machine is configured to implement functions such as object lifecycle management, stack management, thread management, security and exception management, and garbage collection.

The system library may include a plurality of functional modules, for example, a surface manager (surface manager), a media library (Media Library), a three-dimensional graphics processing library (for example, OpenGL ES), and a 2D graphics engine (for example, SGL).

The surface manager is configured to manage a display subsystem and provide fusion of 2D and 3D layers for a plurality of applications.

The media library supports playback and recording in a plurality of commonly used audio and video formats, and static image files. The media library may support a plurality of audio and video coding formats such as MPEG-4, H.264, MP3, AAC, AMR, JPG, and PNG.

The three-dimensional graphics processing library is configured to implement three-dimensional graphics drawing, image rendering, composition, layer processing, and the like.

The 2D graphics engine is a drawing engine for 2D drawing.

The kernel layer is a layer between hardware and software. The kernel layer includes at least a display driver, a camera driver, an audio driver, and a sensor driver.

An embodiment of this application provides a road recognition apparatus, including a processor and a memory configured to store instructions executable for the processor. The processor is configured to implement the road recognition methods shown in FIG. 5 and FIG. 8 when executing the instructions.

An embodiment of this application provides an image obtaining apparatus, including a processor and a memory configured to store instructions executable for the processor. The processor is configured to implement the foregoing image obtaining method when executing the instructions.

An embodiment of this application provides a non-volatile computer-readable storage medium, where the non-volatile computer-readable storage medium stores computer program instructions. When the computer program instructions are executed by a processor, the road recognition method or the image obtaining method is implemented.

An embodiment of this application provides a computer program product, including computer-readable code, or a non-volatile computer-readable storage medium carrying computer-readable code. When the computer-readable code is run on a processor in an electronic device, the processor in the electronic device performs the road recognition method or the image obtaining method.

The computer-readable storage medium may be a tangible device that may retain and store instructions for use by an instruction execution device. The computer-readable storage medium may be, for example, but is not limited to, an electrical storage device, a magnetic storage device, an optical storage device, an electromagnetic storage device, a semiconductor storage device, or any suitable combination thereof. More specific examples (which are a non-exhaustive list) of the computer-readable storage medium include a portable computer disk, a hard disk, a random access memory (Random Access Memory, RAM), a read-only memory (Read-Only Memory, ROM), an erasable programmable read-only memory (Erasable Programmable Read-Only Memory, EPROM or a flash memory), a static random access memory (Static Random Access Memory, SRAM), a portable compact disc read-only memory (Compact Disc Read-Only Memory, CD-ROM), a digital versatile disc (Digital Versatile Disc, DVD), a memory stick, a floppy disk, a mechanical encoded device such as a punched card or a groove protrusion structure storing instructions, and any suitable combination thereof.

The computer-readable program instructions or code described herein may be downloaded from a computer-readable storage medium to each computing/processing device, or downloaded to an external computer or an external storage device over a network, such as the Internet, a local area network, a wide area network, and/or a wireless network. The network may include copper transmission cables, optical fiber transmission, wireless transmission, routers, firewalls, switches, gateway computers, and/or edge servers. A network adapter card or a network interface in each computing/processing device receives computer-readable program instructions from a network, and forwards the computer-readable program instructions for storage in a computer-readable storage medium in each computing/processing device.

The computer program instructions used to perform operations in this application may be assembly instructions, instruction set architecture (Instruction Set Architecture, ISA) instructions, machine instructions, machine-related instructions, microcode, firmware instructions, status setting data, or source code or target code written in one or any combination of more programming languages. The programming languages include object-oriented programming languages such as Smalltalk and C++, and a conventional procedural programming language such as "C" or a similar programming language. The computer-readable program instructions may be executed entirely on a user computer, partly on the user computer, as a stand-alone software package, partly on the user computer and partly on a remote computer, or entirely on the remote computer or a server. When a remote computer is involved, the remote computer may be connected to a user computer over any type of network, including a local area network (Local Area Network, LAN) or a wide area network (Wide Area Network, WAN), or may be connected to an external computer (for example, connected by using an Internet service provider over the Internet). In some embodiments, an electronic circuit, for example, a programmable logic circuit, a field programmable gate array (Field Programmable Gate Array, FPGA), or a programmable logic array (Programmable Logic Array, PLA), is customized by using status information of computer-readable program instructions. The electronic circuit may execute the computer-readable program instructions, to implement various aspects of this application.

The various aspects of this application are described herein with reference to the flowcharts and/or the block diagrams of the method, the apparatus (system), and the computer program product according to embodiments of this application. It should be understood that each block in the flowcharts and/or the block diagrams and combinations of blocks in the flowcharts and/or the block diagrams may be implemented by computer-readable program instructions.

These computer-readable program instructions may be provided to a processor of a general-purpose computer, a special-purpose computer, or another programmable data processing apparatus to produce a machine, so that the instructions, when executed by the processor of the computer or the another programmable data processing apparatus, create an apparatus for implementing functions/actions specified in one or more blocks in the flowcharts and/or the block diagrams. Alternatively, these computer-readable program instructions may be stored in a computer-readable storage medium. These instructions enable a computer, a programmable data processing apparatus, and/or another device to work in a specific manner. Therefore, the computer-readable medium storing the instructions includes an artifact that includes instructions for implementing various aspects of functions/actions specified in one or more blocks in the flowcharts and/or the block diagrams.

Alternatively, these computer-readable program instructions may be loaded onto a computer, another programmable data processing apparatus, or another device, so that a series of operation steps are performed on the computer, the another programmable data processing apparatus, or the another device to produce a computer-implemented process. Therefore, the instructions executed on the computer, the another programmable data processing apparatus, or the another device implements functions/actions specified in one or more blocks in the flowcharts and/or the block diagrams.

The flowcharts and the block diagrams in the appended drawings illustrate system architectures, functions, and operations of possible implementations of apparatuses, systems, methods, and computer program products according to a plurality of embodiments of this application. In this regard, each block in the flowcharts or the block diagrams may represent a module, a program segment, or a part of the instructions, where the module, the program segment, or the part of the instructions includes one or more executable instructions for implementing a specified logical function. In some alternative implementations, the functions marked in the blocks may also occur in a sequence different from that marked in the accompanying drawings. For example, two consecutive blocks may actually be executed substantially in parallel, and sometimes may be executed in a reverse order, depending on a function involved.

It should also be noted that each block in the block diagrams and/or the flowcharts and a combination of blocks in the block diagrams and/or the flowcharts may be implemented by hardware (for example, a circuit or an ASIC (Application-Specific Integrated Circuit, application-specific integrated circuit)) that performs a corresponding function or action, or may be implemented by a combination of hardware and software, for example, firmware.

Although the present invention is described with reference to embodiments, in a process of implementing the present invention that claims protection, a person skilled in the art may understand and implement another variation of the disclosed embodiments by viewing the accompanying drawings, the disclosed content, and the appended claims. In the claims, "comprising" (comprising) does not exclude another component or another step, and "a" or "one" does not exclude a case of multiple. A single processor or another unit may implement several functions enumerated in the claims. Some measures are recorded in dependent claims that are different from each other, but this does not mean that these measures cannot be combined to produce a better effect.

Embodiments of this application are described above. The foregoing descriptions are examples, are not exhaustive, and are not limited to the disclosed embodiments. Many modifications and changes are apparent to a person of ordinary skill in the art without departing from the scope and spirit of the described embodiments. The selection of terms used in this specification is intended to best explain the principles of the embodiments, practical application, or improvements to technologies in the market, or to enable another person of ordinary skill in the art to understand the embodiments disclosed in this specification.

What is claimed is:

1. A road recognition method implemented by a first device, wherein the road recognition method comprises:
   sending, using a command pipeline of a distributed mobile sensing development platform (DMSDP) service and when detecting a road recognition request, a control command to an entity camera corresponding to a first virtual camera hardware abstraction layer (HAL) of two or more virtual cameral HALs of the first device, wherein the control command is for controlling the entity camera to capture a current image around a vehicle;
   receiving, using a data pipeline of the DMSDP service, the current image from the entity camera in response to the control command; and
   recognizing, based on the current image and road information from a local navigation application of the first device, a road on which the first device is located.

2. The road recognition method of claim 1, further comprising:
   obtaining a hardware parameter of the entity camera using the DMSDP service; and
   locally configuring a corresponding virtual camera based on the hardware parameter.

3. The road recognition method of claim 2, wherein the hardware parameter comprises a camera capability parameter of the entity camera, and wherein locally configuring the corresponding virtual camera comprises:
   creating, based on the camera capability parameter, a second virtual camera HAL and a camera framework that correspond to the entity camera; and
   adding the camera framework to a distributed camera framework.

4. The road recognition method of claim 1, wherein recognizing the road on which the first device is located comprises:
   splicing, by a camera HAL of a local camera of the first device, a plurality of current images to obtain a spliced image; and
   recognizing, by the local navigation application based on the spliced image and the road information, the road on which the first device is located.

5. The road recognition method of claim 1, wherein the entity camera is a vehicle-mounted camera.

6. The road recognition method according to claim 2, wherein the entity camera is a vehicle-mounted camera.

7. A data transmission apparatus, comprising:
   a local navigation application;
   two or more virtual camera hardware abstraction layers (HALs) comprising a first virtual camera HAL and a second virtual cameral HAL;
   one or more memories configured to store instructions; and
   one or more processors coupled to the one or more memories and configured to execute the instructions to cause the data transmission apparatus to:
      send, using a command pipeline of a distributed mobile sensing development platform (DMSDP) service and when detecting a road recognition request, a control command to an entity camera corresponding to the first virtual camera HAL, wherein the control command is for controlling the entity camera to capture a current image around a vehicle;

receive, using a data pipeline of the DMSDP service, the current image from the entity camera in response to the control command; and recognize, based on the current image and road information from the local navigation application, a road on which the data transmission apparatus is located.

8. The data transmission apparatus of claim 7, wherein when executed by the one or more processors, the instructions further cause the data transmission apparatus to:

obtain a hardware parameter of the entity camera using the DMSDP service; and locally configure a corresponding virtual camera based on the hardware parameter of the entity camera.

9. The data transmission apparatus according to claim 8, wherein the hardware parameter comprises a camera capability parameter of the entity camera, and wherein locally configuring the corresponding virtual camera:

creating based on the camera capability parameter, a second virtual camera HAL and a camera framework that correspond to the entity camera, and adding the camera framework to a distributed camera framework.

10. The data transmission apparatus according to claim 7, wherein the one or more processors are configured to cause the data transmission apparatus to recognize the road on which the data transmission apparatus is located by causing the one or more processors to:

splice, by a camera HAL of a local camera of the data transmission apparatus, a plurality of current images to obtain a spliced image; and recognize, by the local navigation application and based on the spliced image and the road information, the road on which the data transmission apparatus is located.

11. The data transmission apparatus of claim 7, wherein the entity camera is a vehicle-mounted camera.

12. The data transmission apparatus of claim 8, wherein the entity camera is a vehicle-mounted camera.

13. A computer program product comprising computer executable instructions that are stored on a non-transitory computer-readable medium and that, when executed by one or more processors, cause a data transmission apparatus to:

send, when detecting a road recognition request and using a command pipeline of a distributed mobile sensing development platform (DMSDP) service, a control command to an entity camera corresponding to a first virtual camera hardware abstraction layer (HAL) of two or more virtual camera hardware HALs, wherein the control command is for controlling the entity camera to capture a current image around a vehicle;

receive, using a data pipeline of the DMSDP service, the current image from the entity camera in response to the control command; and recognize, based on the current image and road information from a local navigation application of the data transmission apparatus, a road on which the data transmission apparatus is located.

14. The computer program product of claim 13, wherein when executed by the one or more processors, the instructions are further configured to cause the data transmission apparatus to:

obtain a hardware parameter of the entity camera using the DMSDP service; and locally configure a corresponding virtual camera based on the hardware parameter of the entity camera.

15. The computer program product of claim 14, wherein the hardware parameter comprises a camera capability parameter of the entity camera, and wherein the one or more processors are further configured to cause the data transmission apparatus to locally configure the corresponding virtual camera based on the hardware parameter of the entity camera by causing the data transmission apparatus to:

create, based on the camera capability parameter, a second virtual camera HAL and a camera framework that correspond to the entity camera; and add the camera framework to a distributed camera framework.

16. The computer program product of claim 13, wherein the one or more processors are further configured to cause the data transmission apparatus to recognize the road by causing the data transmission apparatus to:

splice, by a camera HAL of a local camera of the data transmission apparatus, a plurality of current images to obtain a spliced image; and recognize, by the local navigation application based on the spliced image and the road information, the road on which the data transmission apparatus is located.

17. The computer program product of claim 13, wherein the entity camera is a vehicle-mounted camera.

* * * * *